US009286680B1

(12) United States Patent
Jiang et al.

(10) Patent No.: US 9,286,680 B1
(45) Date of Patent: Mar. 15, 2016

(54) COMPUTATIONAL MULTI-CAMERA ADJUSTMENT FOR SMOOTH VIEW SWITCHING AND ZOOMING

(71) Applicant: Futurewei Technologies, Inc., Plano, TX (US)

(72) Inventors: Wei Jiang, Princeton, NJ (US); Jinwei Gu, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/581,788

(22) Filed: Dec. 23, 2014

(51) Int. Cl.
| | |
|---|---|
| H04N 17/00 | (2006.01) |
| H04N 17/02 | (2006.01) |
| G06T 7/00 | (2006.01) |
| H04N 5/247 | (2006.01) |
| H04N 5/262 | (2006.01) |

(52) U.S. Cl.
CPC .............. *G06T 7/0018* (2013.01); *H04N 5/247* (2013.01); *H04N 5/2621* (2013.01); *H04N 17/002* (2013.01); *G06T 2207/20048* (2013.01)

(58) Field of Classification Search
CPC . H04N 13/0246; H04N 17/002; H04N 17/00; H04N 17/02; H04N 13/0011; H04N 5/247; H04N 5/2621; G06T 7/0014; G06T 7/0018; G06T 7/0022; G06T 7/002; G06T 2207/10076; G06T 2207/10016; G06T 2207/20048
USPC ...................... 348/175, 187, 188, 180, 46–48; 382/154, 103, 276; 702/85; 345/419
IPC ........................................... H04N 17/00, 17/02
See application file for complete search history.

(56) References Cited

U.S. PATENT DOCUMENTS

| | | | | |
|---|---|---|---|---|
| 2004/0234124 | A1* | 11/2004 | Nakai | .................... G06T 7/002 382/154 |
| 2007/0076977 | A1* | 4/2007 | Chen | ..................... G06K 9/209 382/276 |
| 2008/0181488 | A1* | 7/2008 | Ishii | .......................... B60R 1/00 382/154 |

OTHER PUBLICATIONS

Hartley, R. et al., "Multiple View Geometry in Computer Vision," (Second Edition), Cambridge University Press, 2004, 673 pages.
Levoy, M. et al., "Light Field Rendering," Computer Science Department, Stanford University, 1996, 12 pages.
Lourakis, M. et al., "SBA: A Software Package for Generic Sparse Bundle Adjustment," ACM Transaction on Mathematical Software, vol. 36, No. 1, Article 2, Mar. 2009, 30 pages.
Wilburn, B. et al., "High Performance Imaging Using Large Camera Arrays," 2005, 12 pages.
Zhang, Z., "A Flexible New Technique for Camera Calibration," IEEE Transactions on Pattern Analysis and Machine Intelligence, 2000, 22 pages.

* cited by examiner

*Primary Examiner* — Sherrie Hsia
(74) *Attorney, Agent, or Firm* — Slater & Matsil, L.L.P.

(57) ABSTRACT

An embodiment method for computationally adjusting images from a multi-camera system includes receiving calibrated image sequences, with each of the calibrated image sequences corresponding to a camera in a camera array and having one or more image frames. A target camera model is computed for each camera in the camera array and according to target camera poses or target camera intrinsic matrices for the respective camera. The computing generates a transformation matrix for each of the one or more first cameras. The transformation matrix for each of the one or more first cameras is applied to the calibrated image sequence corresponding to the respective camera. The transformation matrix warps each image frame of the calibrated image sequence and generates target image sequences.

20 Claims, 6 Drawing Sheets

COMPUTATIONAL MULTI-CAMERA ADJUSTMENT FOR SMOOTH VIEW SWITCHING AND ZOOMING

TECHNICAL FIELD

The present invention relates generally to a system and method for adjusting images in multi-camera arrays, and, in particular embodiments, to a system and method for correcting the flaws inherent in individual cameras and adjusting the displacement, rotation or focal length of a camera in relation to other cameras in a camera array.

BACKGROUND

Increasingly powerful computation, large storage, and expanding transmission bandwidths have enabled a wide variety of applications in the video and imaging market, which provides modern users all kinds of enriched visual experiences. The advent of inexpensive digital cameras has enabled many sensing systems that incorporate large numbers of cameras, such as the Stanford multi-camera array as part of the Stanford Immersive Television Project. Using clusters of inexpensive cameras to capture dynamic real-world scenes, users can be provided with a large variety of immersive experiences such as digital refocusing and synthetic large aperture that otherwise either are impossible or can only be obtained through particular high-end expensive professional devices.

Images taken from multiples cameras in a camera array can be sequenced together to provide these immersive experiences without requiring specialized equipment. Smooth view switching and zooming is highly demanded in practice for rich viewing experiences in television and movie production. Switching frames across multiple cameras over time creates the effect of a single camera is moving around. The dolly effect, the freeze time (or bullet time) effect, and the long panorama effect, for instance, are the most popular ones, and can be widely seen in movies, in broadcasts, and in documentary videos.

Another way of creating smooth view switching effects is through light field rendering (or image-based rendering), which can synthesize different views of a scene. However, light field rendering can only obtain reasonable results when a dense sampling is available, i.e., when a large number of cameras are placed densely together to have large overlapping fields-of-view, since oversampling is required to counter the undesirable aliasing effects in the outputs. Also, light field rendering requires much higher computation to create synthetic views than direct view switching, which makes it quite difficult to be used for real-time or online video production. The costs, both in terms of the large number of cameras and in terms of large amounts of required computational power, are generally not realistic either for live broadcasting or for small consumer groups.

SUMMARY

An embodiment method for computationally adjusting images from a multi-camera system includes receiving calibrated image sequences, with each of the calibrated image sequences corresponding to a camera in a camera array and having one or more image frames. A target camera model is computed for each camera in the camera array and according to target camera poses or target camera intrinsic matrices for the respective camera. The computing generates a transformation matrix for each of the one or more first cameras. The transformation matrix for each of the one or more first cameras is applied to the calibrated image sequence corresponding to the respective camera. The transformation matrix warps each image frame of the calibrated image sequence and generates target image sequences.

An embodiment system includes a processor and a non-transitory computer readable medium in communication with the processor and having instructions stored thereon. The instructions cause the processor to acquire a plurality of image sequences, with each of the image sequences corresponding to a camera of a plurality of cameras in a camera array. The instructions further cause the processor to generate a plurality of calibrated image sequences from the plurality of acquired image sequences, compute a plurality of target camera models, with each of the plurality of target camera models corresponding to one of the plurality of cameras, and generate a plurality of transformation matrices for the plurality of cameras according to the target camera models. The instructions further cause the processor to generate a plurality of target image sequences from the plurality of calibrated image sequences and according to the plurality of transformation matrices.

Another embodiment system includes a camera array having a plurality of cameras, with each of the plurality of cameras having an overlapping field of view with another camera of the plurality of cameras, and a processing system in signal communication with the camera array. The processing system has a non-transitory computer readable medium having stored thereon instructions for causing processing system to cause the plurality of cameras to acquire a plurality of image sequences and generate a plurality of calibrated image sequences from the plurality of acquired image sequences according to intrinsic and extrinsic parameters of the plurality of cameras. The instructions further cause processing system to save the plurality of calibrated image sequences to a second non-transitory computer readable medium, generate a plurality of target image sequences from the plurality of calibrated image sequences, with each of the plurality of target image sequences generated according to intrinsic parameters and extrinsic parameters of a model camera corresponding to a camera of the plurality of cameras, and generate an output image sequence from one or more of the plurality of target image sequences.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Additionally, the methods and apparatuses described may be applied to image processing and camera compensation, but are not specifically limited to the same.

Modern video effects, such as smooth view switching, zooming, dolly effect (where a camera appears to move along a track), freeze time effect (also known as bullet time) effect, and the long panorama effect are frequently used in live or recorded video production. Traditionally, smooth view switching effects can only be provided by professional productions, where high-end professional systems comprising of lots of advanced cameras, lenses, as well as precise mounting machines are used. The camera intrinsic parameters are carefully chosen and manually tuned. The cameras are precisely mounted with accurate manual measurements. The captured footage is manually post-processed to ensure smooth view switching effects. More recently, camera arrays have been used to reproduce these expensive and labor intensive effects. Multiple cameras in an array permit switching frames across multiple cameras over time and create the effect as if a single camera is moving around.

Figure 1A:
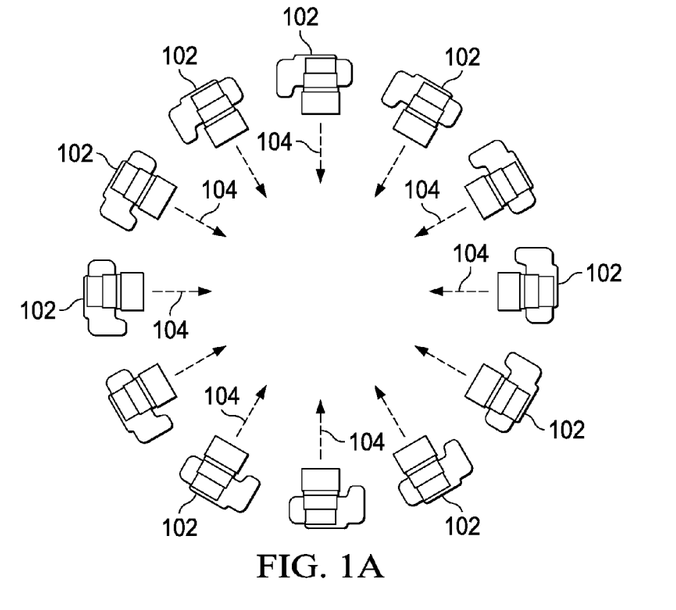
FIGS. 1A through 1D are diagrams illustrating arrays of cameras according to various embodiments.

FIGS. 1A through 1D illustrate multi-camera arrays that can be used with embodiment processing systems and methods for producing video effects. FIG. 1A is a diagram illustrating an array of cameras 102 focused on a central focus point according to an embodiment. In such an embodiment, the cameras 102 are posed to look at a same target in a 3D location (i.e., a center of focus); with focal axes 104 of the cameras 102 converging at the target object. For instance, the freeze time or bullet-time effect may be produced using such an arrangement. Image frames of the object are simultaneously captured of the object, and during playback, frames from different directions and taken at the same time are played sequentially, showing the target object as if it were motionless. In an embodiment, the cameras 102 are connected to one or more processors, computer systems or control circuits to gather image data from the cameras for processing and smoothing.

Figure 1B:
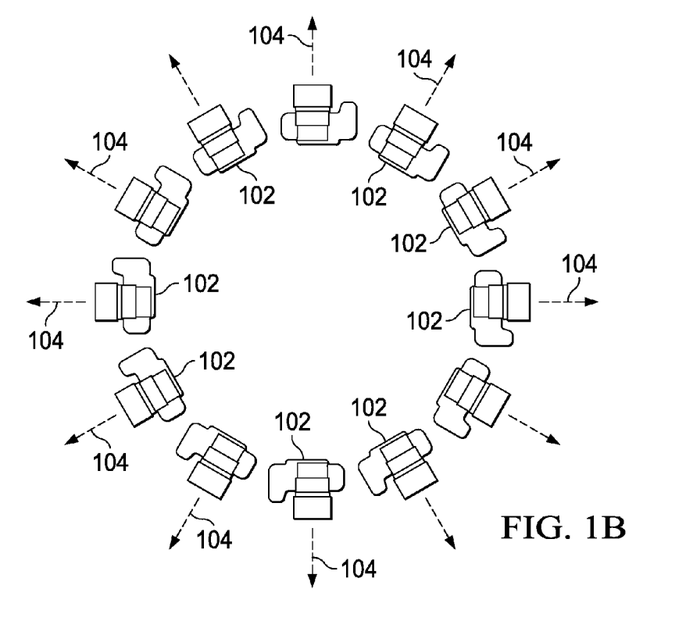

FIG. 1B is a diagram illustrating an array of outward facing cameras 102 according to an embodiment. In such an embodiment, the cameras 102 have divergent focal axes 104. It should be noted that, while the cameras 102 have divergent focal axes 104, the cameras 102 have, in some embodiments, overlapping fields of view.

Figure 1C:
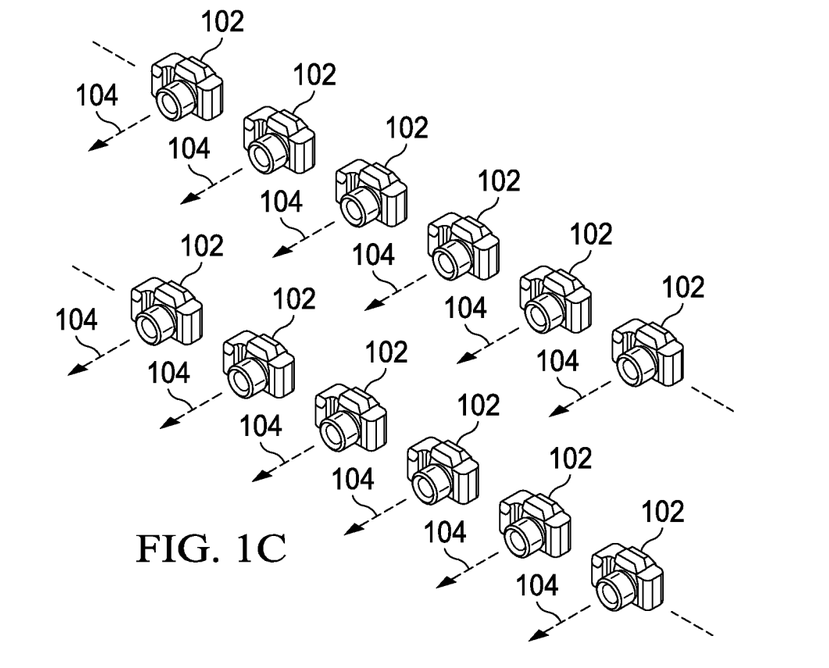

FIG. 1C is a diagram illustrating an array of cameras 102 arranged in a planar array according to an embodiment. In such an embodiment, the cameras 102 may be posed facing the same direction to provide a long panorama or dolly effect. Therefore, the cameras 102 have focal axes 104 that are substantially parallel, or that converge at a relative large distance from the cameras 102.

Figure 1D:
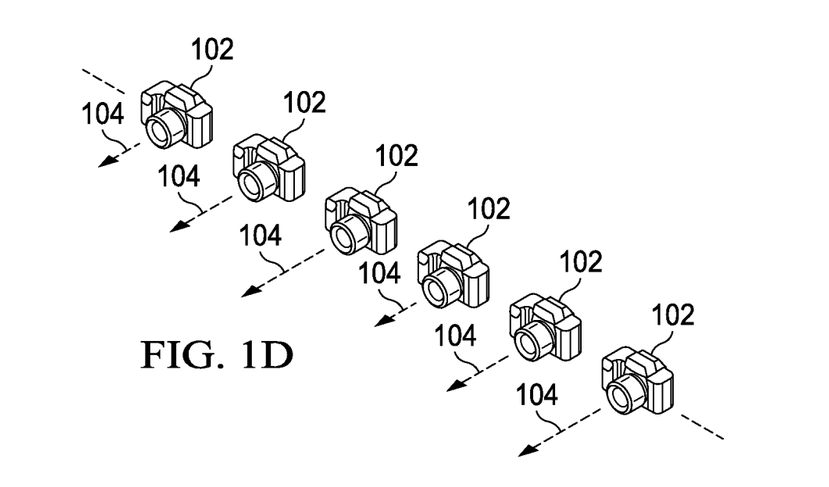

FIG. 1D is a diagram illustrating an array of cameras 102 arranged in an array, with the cameras having different focal lengths according to an embodiment. In some embodiments, the focal axes 104 converge at a target object, and the different focal lengths provide images with different zoom factors. Sequentially playing images from cameras with different focal lengths provides a smooth zooming effect without requiring physical zooming of a particular camera, and permitting video with a greater range of zoom than a single camera could provide.

It should be understood that the cameras of the embodiments shown in FIGS. 1A through 1D may be coupled to a computer system with a processor for processing and manipulating image data, and that in some embodiments, the computer controls the timing and capture of images, and in other embodiments, a separate camera controller may be employed, with the computer system acting as a processing system. The arrangements of cameras 102 illustrated above also permit multiple image sequences to be temporally synchronized. That is, for a given timestamp, one can locate one frame in each image sequence that is recorded at that time (or roughly at that time) by the corresponding camera 102.

The systems and methods described herein automatically and computationally adjust, in a multi-camera system, the extrinsic camera poses such as rotation, as well as the camera intrinsic parameters such as focal length, camera optical center, sensor skew, pixel aspect ratio, lens distortion, etc. The method can be used by various multi-camera systems with different configurations including different camera models, different numbers of cameras, different camera placements, etc. The systems and methods provide the flexibility to easily set different camera poses as well as different intrinsic parameters to accommodate different smooth view switching and zooming effects.

Presented herein are systems and methods for taking image data from multiple cameras, and computationally adjusting the images to produce images with smooth and regular transitions between them. In some embodiments of the systems and methods, images are adjusted by normalizing the camera parameters and then adjusting the camera parameters to achieve a desired modification to the image. The images are normalized by correcting the intrinsic parameters of the cameras to compensate for individual imperfections in each of the individual cameras, and correcting the extrinsic parameters of the cameras to compensate for inaccuracies in camera positioning and focus. Normalization of the images eliminates the need obtain perfect camera spacing or placement configurations, especially for regular consumer-grade cameras, by removing inevitable discrepancies in camera intrinsic parameters and lens distortions, random variations in manufacturing, vibrations of the multi-camera system, inaccuracy in the camera mounting systems, etc. Such imperfections, even at low levels, will cause considerable shaky and wobbling artifacts when one switches views continuously.

The intrinsic and extrinsic parameters are used to adjust the images generated by each camera to generate compensated or calibrated image sequences. Models are generated for target cameras to reflect a desired shift or change of the cameras from the pose and parameters of the normalized cameras. The target cameras are artificial constructs representing the desired camera location and orientation to provide the desired smoothing and motion effects. The compensated images are then modified according to parameters generated for the target cameras. The compensated images are modified using, for example, a general homography transformation matrix, resulting in images that appear to have been captured by the target cameras.

The calculation of target cameras permits automatic adjustment of the target camera poses, as well as the camera intrinsic parameters such as focal length, camera optical center, sensor skew, pixel aspect ratio, lens distortion etc. Different multi-camera systems or different camera configurations, including different camera models, different numbers of cameras, different camera placements, etc. can be used to provide the images without requiring modifications or undue experimentation. This enables multi-camera systems using consumer-grade cameras, lenses, and mounting devices to create smooth view switching and zooming effects without perfectly-consistent camera intrinsic parameters or without perfectly-placed camera poses.

When implemented with multiple cameras, both the extrinsic and intrinsic parameters of these cameras should be consistent with each other so that all these multiple cameras behave as if a single camera is moving in space. The extrinsic parameters, including the cameras' 3D positions and 3D poses, should be accurately adjusted so that the path of these cameras is smooth and the cameras are looking at the desired location. Thus, each image taken from different cameras can be normalized to have similar optical properties, preventing inconsistencies in a video sequence formed from sequential images from different cameras. Similarly, accurate 3D positioning of the cameras provides a smooth video stream when images from different cameras are integrated into a single video stream.

The embodiments described herein provide a computational system that replaces the manual adjustment and correction process traditionally required for video production, significantly reducing costs including human labor, computation, and hardware devices such as cameras, lenses, and camera mounting equipment. Additionally, since different effects can be generated from the same source images, the embodiments increase the flexibility of camera system configurations and smooth viewing effect configurations. The systems and methods provide real-time smooth view switching and zooming effects in live production. The computational cost of the transformation embodiments is low, as only one frame warping operation is needed to process each frame. Thus, the manual labor and equipment associated with traditional camera preparation methods, and the dense camera array and high computational power associated with light field rendering methods can be avoided.

Figure 2:
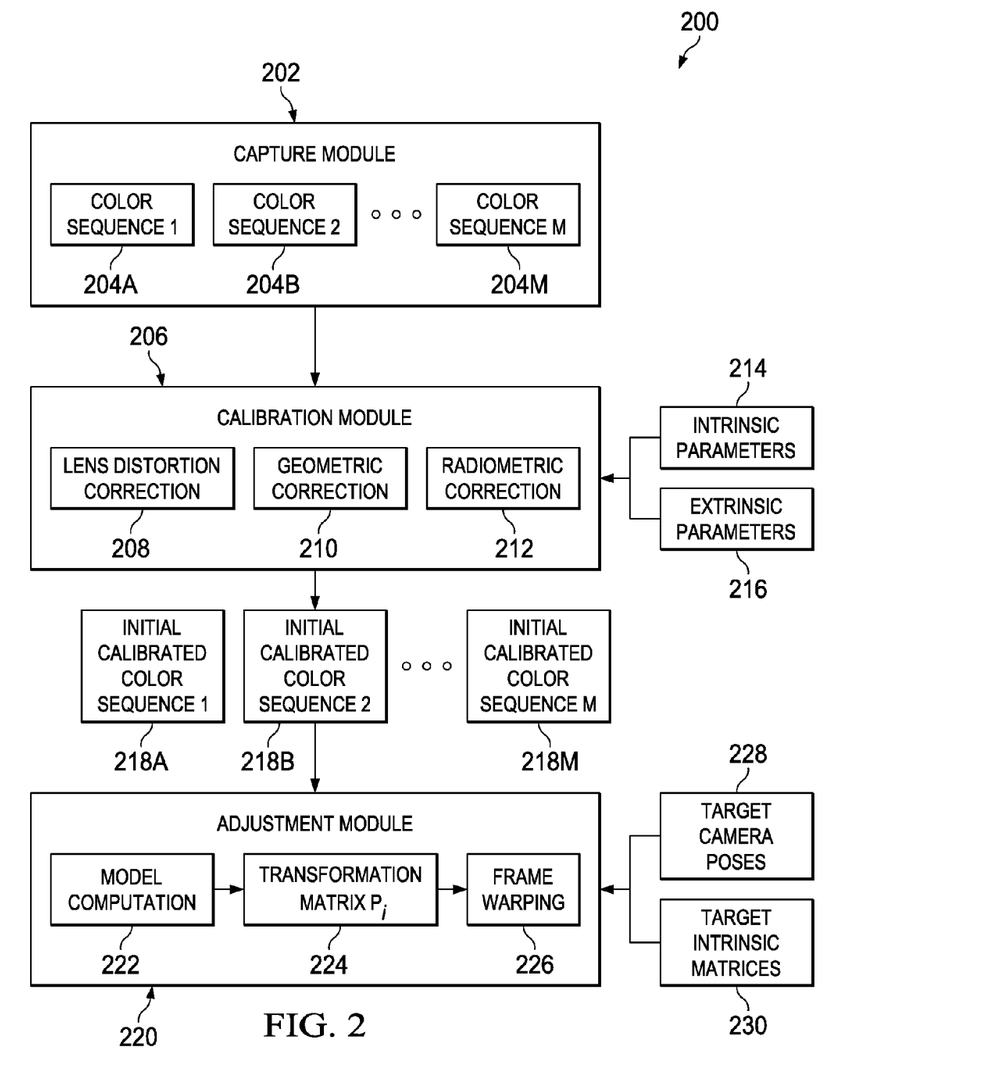
FIG. 2 is a diagram illustrating a processing system for adjusting images from a multi-camera array according to some embodiments.

FIG. 2 is a diagram illustrating a processing system 200 for adjusting images from a multi-camera array according to some embodiments. The processing system 200 has a capture module 202 that acquires image sequences 204A . . . 204M. The capture module 202 captures a target scene through a multi-camera system having a plurality of cameras. It should be noted that the captured scene can be static or have moving objects in various indoor or outdoor environments. Additionally, there is no constraint on the number of cameras, as any number of cameras can be used to acquire image sequences. The capture module 202 generates, captures or acquires a plurality of image sequences, with each acquired image sequence each coming from one camera recording the target scene over time from a particular view. Each camera $C_i$ can be placed in the 3D real world arbitrarily, as long as there exists another camera $C_j$ that has a large enough overlapping field-of-view (determined by a threshold $t_c$) with $C_i$. The relative positions and poses of the cameras are fixed during each recording. The position and pose of the entire multi-camera system can changed during a recording. For example, the entire multi-camera system can be mounted on a moving platform for recording. For capturing different scenes, the relative positions and poses of the cameras can be reconfigured.

The capture module 202 may save the image sequences 204A . . . 204M to a computer memory, and may also make them available for live or real-time processing, for example, during a live broadcast. The capture module 202 may, in some embodiments, be a dedicated hardware device with image sequence acquisition circuitry dedicated to controlling one or more cameras. The image sequence acquisition circuitry may be connected to the cameras to cause the cameras to capture an image, and the capture module 202 may then fetch or receive the image sequences 204A . . . 204M from the cameras. In other embodiments, the capture module 202 is a software module disposed in a non-transitory computer readable medium on a computer having a processor configured to execute instructions in the capture module software. The capture module software may also control or otherwise cause the cameras to capture the image sequences 204A . . . 204M. Additionally, in some embodiments, the capture module 202 may be separate from, and in signal communication with, the cameras, or may have one or more of the cameras integrated into the hardware of the capture module 202.

The image sequences 204A . . . 204N captured by the capture module 202 are processed in a calibration module 206. The calibration module 206 normalizes images from different cameras to correct for imperfections in the individual camera hardware or positioning. In the calibration module 206, intrinsic parameters 214 and extrinsic parameters 216 are used to align the set of temporally-synchronized image frames recorded in the image sequences 204A . . . 204M at each given timestamp. The alignment includes one or both of lens distortion correction 208 and/or geometric correction 210 operations. Lens distortion correction 208 for each of the image sequences is performed using the intrinsic camera parameters 214. Geometric correction 210 is performed geometrically warping each of the image frames to align with a reference frame using the intrinsic parameters 214 and the extrinsic parameters 216. Further operations of radiometric correction 212 can also be performed where one can adjust the color appearance of the image frames from different image sequences 204A . . . 204M to ensure that white balance, image temperature, contrast and other optical image properties are consistent across the calibrated image sequences 218A . . . 218M.

The calibration module 206, in some embodiments, individually corrects each frame from each camera. For example, let [X,Y,Z] denote a 3D point in the 3D real world, and let $[u_i, v_i]$ denote a 2D point in the image plane corresponding to the camera $C_i$. Each camera $C_i$ is normally modeled by the usual pinhole, resulting in the following relationship between the 3D point and the 2D point:

$$\alpha_i [u_i, v_i, 1]^t = K_i R_i ([X, Y, Z, 1]^t - [T_i, 1]^t) \quad (1)$$

In Equation 1, $\alpha_i$ is an arbitrary scale factor, $R_i$ is a 3×3 camera rotation matrix, $T_i$ is a 3×1 camera position vector, and $R_i$ and $T_i$ together are called the extrinsic parameters for the camera $C_i$. $K_i$ is a 3×3 camera intrinsic matrix for the camera $C_i$. Each camera $C_i$ is also associated with a set of lens distortion parameter $D_i$, due to the non-ideal lens used by normal cameras. $K_i$ and $D_i$ together are called the intrinsic parameters for the camera $C_i$. The generation or acquisition of the intrinsic and extrinsic parameters for calibration is discussed in greater detail below.

In some embodiments, the camera intrinsic matrix $K_i$ is a 3×3 matrix with 5 parameters:

$$K_i = \begin{bmatrix} f_x & r & o_x \\ 0 & f_y & o_y \\ 0 & 0 & 1 \end{bmatrix}$$

where $f_x$ and $f_y$ are the focal length in the x and y axis, respectively, $o_x$ and $o_y$ represent the location of the principle point in the x and y axis, respectively, r gives the skew coefficient between the x and y axis. Tuning $K_i$, for example, can be where one ensures the same focal length in both x and y axis for all the cameras while keeping the other elements unchanged. Then the new $K^*_i$ can be determined by keeping the r, $o_x$, $o_y$ elements of the original $K_i$ and changing $f_x$ and $f_y$ to new $f^*_x$ and $f^*_y$. The new $f^*_x$ and $f^*_y$ can be optimized so that $f^*_x$ and $f^*_y$ has the minimum overall distance to the original $f_x$ and $f_y$ of all the cameras. For example, if all the cameras have similar focal length, $f_x$ and $f_y$ can be roughly determined as the average value of the original $f_x$ and $f_y$ of all the cameras, respectively.

The calibration module 206 applies lens distortion correction 208, geometric correction 210 and radiometric correction 212, where applicable, to generate calibrated image sequences such as initial calibrated color sequences 218A . . . 218M. Thus, the calibration module 206 applies the $D_i$ lens distortion parameter 208, and then performs the geometric correction 210 by applying Equation 1 to the lens distortion corrected image sequences. In some embodiments, the calibration module 206 saves the calibrated image sequences 218A . . . 218M to a non-transitory computer readable storage medium, or saves archive copies for subsequent processing. The calibrated image sequences 218A . . . 218M are normalized to provide regular and consistent images between cameras and with respect to time stamps. Thus, images from different cameras corresponding to the same time stamp will provide a smoothed image sequence for a freeze time or bullet time effect. Copies of the calibrated image sequences 218A . . . 218M may be used for multiple processing tasks since the calibrated image sequences 218A . . . 218M are a normalized set of images. For example, a first output image sequence may be generated directly from the calibrated image sequences 218A . . . 218M, while a second output image sequence may be generated by subsequent processing of the calibrated image sequences 218A . . . 218M.

The calibration module 206 may, in some embodiments, be a dedicated hardware device with image processing circuitry dedicated to processing and calibrating the image sequences 204A . . . 204M. The image processing circuitry may fetch or receive the image sequences 204A . . . 204M from storage, or receive them directly from the capture module 202 for calibration. In other embodiments, the calibration module 206 is a software module disposed in a non-transitory computer readable medium on a computer having a processor configured to execute instructions in the calibration module software. The calibration module software may be in communication with the capture module 202 to trigger image capture. Additionally, in some embodiments, the calibration module 206 may be separate from the capture module 202 and cameras, or may be integrated into a same hardware or software system as the capture module 202 or cameras.

The processing system 200 further has an adjustment module 220 for processing the calibrated image sequences 218A . . . 218M. The adjustment module 220 provides a system for modifying the images to give the appearance of rotating and repositioning the camera or adjusting the camera parameters. Given a plurality of target camera poses and a plurality of target camera intrinsic matrices, a target camera pose $R^*_i$ for a camera $C_i$, where $R^*_i$ is a 3×3 target camera rotation matrix, and a target camera intrinsic $K^*_i$ for a camera $C_i$. The calibrated image sequences 218A . . . 218M are further processed by performing multi-camera adjustment for creating smooth view switching and zooming effects using the target camera rotation and intrinsic matrices. The adjustment module 220 computes a model for a target camera to give the desired output image. The model computation 222 generates a transformation matrix 224 that is applied to frames or images from the calibrated image sequences 218A . . . 218M for frame warping 226.

In the model computation 222, a 3×3 transformation matrix $P_i$ 224 is computed for each camera $C_i$. A 2D point $[u_i,v_i]$ in the image plane corresponds to a 3D point $(X,Y,Z)$ captured by the camera $C_i$ with the original camera position and pose $(R_i, T_i)$ and the original camera intrinsic matrix $K_i$. Equation 1 gives the relationship between $[u_i,v_i]$ and $(X,Y,Z)$. Let $[u^*_i, v^*_i]$ denote a 2D point in a target image plane corresponding to the same 3D point $(X,Y,Z)$ to be captured by a target camera with a target position and poses 228 $(R^*_i,T^*_i)$, and a target camera intrinsic matrix $K^*_i$ 230. Substituting the target camera parameters into Equation 1 results in the following:

$$\alpha^*_i[u^*_i,v^*_i,1]^t = K^*_i R^*_i ([X,Y,Z,1]^t - [T^*_i,1]^t) \quad (2)$$

In Equation 2, $\alpha^*_i$ is an arbitrary scale factor. In some embodiments, $T^*_i = T_i$, i.e., the camera position of each camera $C_i$ does not change. Then, based on Equation 1 and Equation (2), the relationship between $[u_i,v_i]$ and $[u^*_i, v^*_i]$ is given by:

$$[u^*_i,v^*_i,1]^t \sim K^*_i R^*_i R_i^{-1} K_i^{-1} [u_i,v_i,1]^t \quad (3)$$

In Equation 3, ~ means equal up to a scale. The transformation matrix $P_i$ is given by:

$$P_i = K^*_i R^*_i R_i^{-1} K_i^{-1} \quad (4)$$

where, $R_i^{-1}$ is an inverse rotation matrix of the camera corresponding to the transformation matrix, and $K_i^{-1}$ is an inverse intrinsic matrix of the camera corresponding to the transformation matrix. The transformation matrix $P_i$ 224 can be a 3×3 matrix and a general homography, which has 8 degrees-of-freedom (DOF). A general homography is a matrix for perspective translation. Assuming linear projectivity, the general homography reduces to a 5-DOF affine transformation. Assuming single rotation and isotropic scaling, the affine transformation further reduces to a 4-DOF similarity transformation. Each of the homography, the affine transformation, or the similarity transformation can serve as $P_i$.

After generating the transformation matric $P_i$ 224, the adjustment module 220 performs frame warping 226 on the calibrated image sequences 218A . . . 218M. The transformation matrix $P_i$ is used to warp the original color frame $I_i$ into the target frame $I^*_i$ for each camera $C_i$. When Equation (3) is applied to every image point, the adjustment module 220 generates a target image frame $I^*_i$ that is a warped version of an original image frame $I_i$. Thus, when applied to each image frame in an image sequence, the adjustment module 220 generates a target image sequence as a warped version of the original image sequence 204A . . . 204M for each camera $C_i$. The target image sequence is the synthesized image sequence that can be viewed as if it were captured from the target camera with the target camera position and pose 228 ($R^*_i$, $T^*_i$), and the target camera intrinsic matrix $K^*_i$ 230. The computation cost of the embodiments is low, as only one frame warping operation is needed to process each frame, and the computation of $P_i$ is negligible.

The adjustment module 220 may, in some embodiments, be a dedicated hardware device with image processing and adjustment circuitry dedicated to transforming the calibrated image sequences 218A . . . 218M. The image processing and adjustment circuitry may fetch or receive the calibrated image sequences 218A . . . 218M from storage, or receive them directly from the calibration module 206. In other embodiments, the adjustment module 220 is a software module disposed in a non-transitory computer readable medium on a computer having a processor configured to execute instructions in the adjustment module software. In some embodiments, the adjustment module 220 may be separate from the calibration module 206, capture module 202 and cameras, or may be integrated into a same hardware or software system as the calibration module 206, capture module 202 or cameras.

After the adjustment module 220 generates the target image sequences, the processing system 200 may, in some embodiments, save the target image sequences to a memory, or to a non-transitory computer readable medium. Additionally, the adjustment module 202 may generate output image sequences using images from one or more of the target image sequences. For example, the output image sequence for a freeze-time output image sequence may have images from multiple target image sequences, with each target image corresponding to the same timestamp. Thus, sequentially playing the images from the different target image sequences would give the impression of different points of view of a stopped or frozen subject. In other embodiments, the output image sequence may comprise images from different target image sequences at different time stamps, giving a panorama, smooth zooming or view switching effects. In yet other embodiments, the output image sequence may be a single target image sequence.

In some embodiments, the system 200 displays the output image sequences to a user by sending the output image sequences to a display such as a computer monitor or display screen, or to a broadcasting apparatus such as a cable system, an internet server, an over-the-air broadcast system transmitter, or the like.

Figures 3, 4:
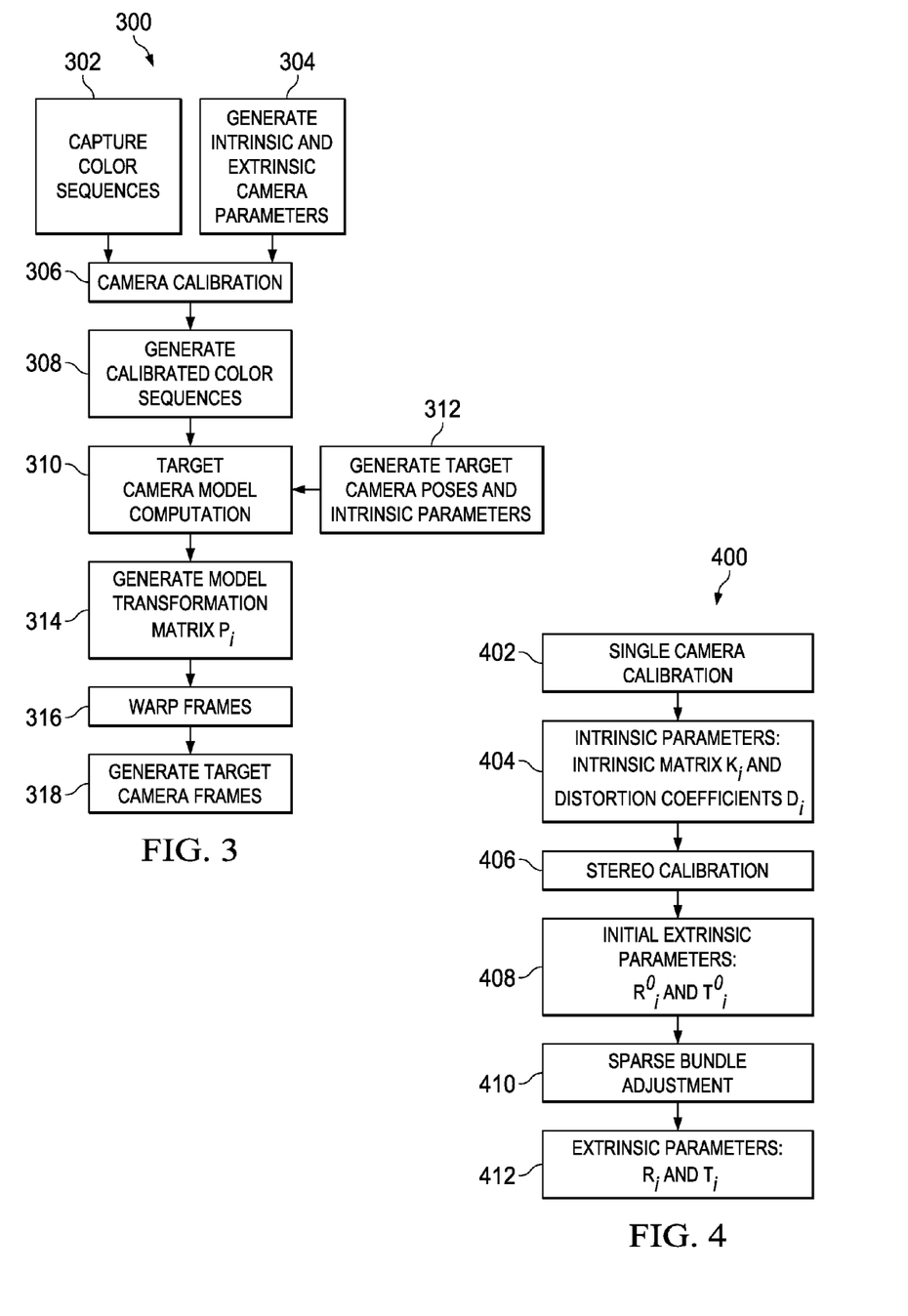
FIG. 3 is a flow diagram illustrating a method of adjusting images from a multi-camera system according to some embodiments.
FIG. 4 is a flow diagram illustrating a method for generating the intrinsic and extrinsic parameters for cameras according to some embodiments.

FIG. 3 is a flow diagram illustrating a method 300 of adjusting images from a multi-camera system according to some embodiments. Image sequences are captured in block 302 by the cameras. In block 304, the intrinsic and extrinsic camera parameters are generated, gathered, received or otherwise obtained as discussed in greater detail below. The image sequences for each camera are calibrated in block 306 by the calibration module by correcting lens distortion, image geometry, or radiometry of the images. Calibrated image sequences are generated in block 308 as a result of the calibration of the image sequences. In block 312, target camera poses and intrinsic parameters are obtained. The target camera models are computed in block 310 by the adjustment module and using the target camera poses and intrinsic parameters. The model transformation matrix is generated in block 314 and applied to the frames of the calibrated image sequences to warp the frames in block 316. The warping of the frames generates the target camera frames in block 318 for the target image sequences and output image sequence.

FIG. 4 is a flow diagram illustrating a method 400 for generating the intrinsic and extrinsic parameters of the cameras according to some embodiments. In some embodiments, a calibration pre-process is conducted to compute the intrinsic parameters for each of the cameras. Initially, in a calibration pre-process, for each camera $C_i$, the camera intrinsic matrix $K_i$ and the set of lens distortion coefficients $D_i$ are computed through a Single Camera Calibration process in block 402. $K_i$ and $D_i$ can be computed, for example, using a camera calibration technique that includes taking images of a model plane in different orientations, detecting feature points in the model plane, estimating the intrinsic and extrinsic parameters in a closed form solution, estimating the radial distortion and then minimizing the estimation parameters. See, for example, Zhang, "A flexible new technique for camera calibration," *IEEE Trans. PAMI,* 2000, which is incorporated herein by reference.

The single camera calibration of block 402 generates the intrinsic matrix $K_i$ and distortion coefficients $D_i$ in block 404. In block 406, a stereo calibration process is used to compute, for each camera $C_i$, a set of initial extrinsic parameters comprising of a 3×3 initial camera rotation matrix $R^o_i$ and a 3×1 initial camera translation vector $T^o_i$. The initial extrinsic parameters can be computed by comparing each camera $C_i$ with a reference camera. The reference camera can be any one of the cameras in the multi-camera system. Thus, each camera is referenced from a same point or camera to eliminate variances in rotation and translation between cameras. In some embodiments, the extrinsic parameters of the camera are generated, at least in part, by extraction of the essential matrix using the differences in images from the camera under test and the reference camera. See, for example, Hartley and Zisserman, *Multiple view geometry in computer vision* (2nd ed.), Cambridge University Press, 2004, which is incorporated herein by reference. The stereo calibration of block 406 generates the initial extrinsic camera parameters $R^o_i$ and $T^o_i$ in block 408.

In block 410, a sparse bundle adjustment process generates the extrinsic parameters $R_i$ and $T_i$ for each camera. The set of initial extrinsic parameters $R^o_i$ and $T^o_i$ are refined to obtain a set of final extrinsic parameters, i.e., the camera rotation matrix $R_i$ and the camera translation vector $T_i$ for each camera $C_i$. The sparse bundle adjustment refines the set of initial extrinsic parameters $R^o_i$ and $T^o_i$ to find the set of parameters that most accurately predict the locations of observed points in multiple images. An estimate of the parameters required to generate measured image point coordinates, and the uncertainty of the measurements is then minimized by adjusting the estimated parameters. See, for example, Lourakis and Argyros, "SBA: A Software Package for Generic Sparse Bundle Adjustment", *ACM Trans. Math. Software,* 2009, which is incorporated herein by reference.

It should be understood that not every extrinsic or intrinsic parameter need be generated by the system. For example, some of the intrinsic and/or extrinsic parameters can be obtained through the camera manufacturer, and the remaining intrinsic and extrinsic parameters can be computed through the calibration pre-process described above.

The embodiments of the system and methods provide flexibility in setting the target camera pose and target camera intrinsic matrix. For example, one target camera intrinsic matrix can be set for all the cameras to enforce consistent camera intrinsic setting for smooth view switching effects. One common target camera pose can be set for all cameras, for example, in the planar camera configuration (See FIG. 1C) so that all cameras are looking at the same direction.

Figure 5:
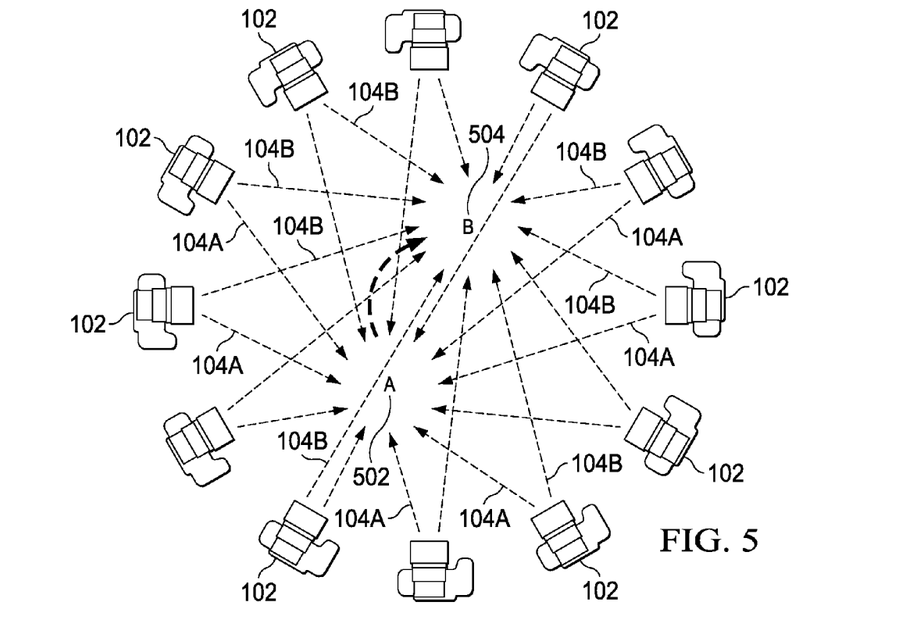
FIG. 5 is diagram illustrating cameras in a circular array with a changeable center of focus according to an embodiment.

FIG. 5 is a diagram illustrating a top view of cameras 102 in a circular array with a changeable center of focus according to an embodiment. The target camera intrinsic matrices are set to be the same, and the target camera poses are set to look at the center of focus 502 and 504. The center of focus 502 and 504 can freely move within the field-of-view of the multi-camera system. Thus, a first common center of focus 502 can be set with first target camera parameters so that all cameras are looking at a first center of focus 502. The center of focus can be freely moved to a second center of focus 504 by adjusting the cameras with second target camera parameters and without physically moving or rotating the cameras. Modifying the target camera parameters effectively changes the focus of the cameras from having first focal axes 104A converging at the first center of focus 502 to having second focal axes 104B of the cameras converging at the second center of focus 504.

Figure 6:
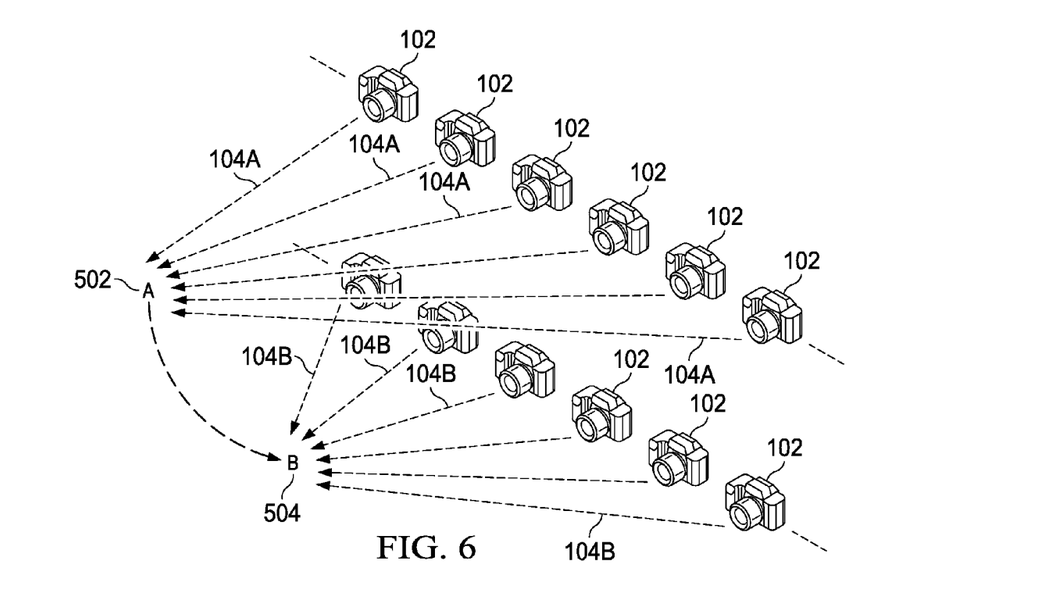
FIG. 6 is a diagram illustrating a planar array of cameras having multiple points of focus according to an embodiment.

FIG. 6 is a diagram illustrating a planar array of cameras having multiple points of focus according to an embodiment. The set of target camera poses for a first part of the camera array may be defined to treat a first 3D point as a first center of focus 502, and define the target camera poses of a second part of the camera array to treat another 3D point as a second center of focus 504. Thus, some cameras 102 will have first focal axes 104A converging at the first center of focus 502 and other cameras will have second focal axes 104B converging at the second center of focus 504. Such an arrangement may be useful in the outside-looking-in configuration (See FIG. 1A), inside-looking-out configuration (See FIG. 1B), or the planar configuration (See FIGS. 1C and 1D). In such configurations, the centers of focus can freely move within the field-of-view of the multi-camera system, permitting the center of focus to be moved without adjusting the physical alignment and position of the cameras 102. Moreover, one can set the target camera intrinsic matrices so that neighboring cameras continuously varying focal lengths to neighboring cameras in order to achieve a smooth zooming effect. Different settings can be used when capturing different scenes and creating different view switching and zooming effects.

Figure 7:
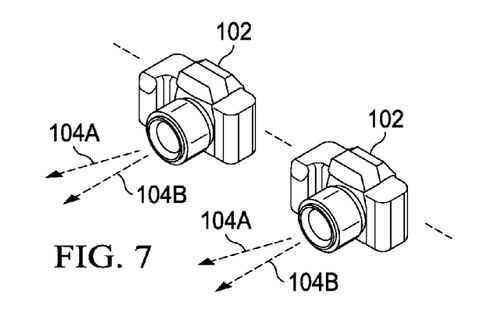
FIG. 7 is a diagram illustrating an example of the original camera pose and the target camera pose according to some embodiments.

FIG. 7 is a diagram illustrating an example of the original camera pose and the target camera pose according to some embodiments. Computation of the target camera parameters permits the calculation of where the focal axes 104A and 104B for the cameras 102 will be aligned. The normalization or calibration for the cameras 102 brings the initial focal axes 104A into alignment with each other, and the target camera computation and image transformation generates second focal axes 104B directed at a desired focal point by changing the focal axes.

Figure 8:
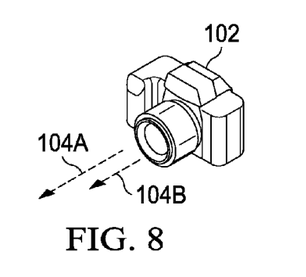
FIG. 8 is a diagram illustrating an example of a first focal axis with an original focal length and second focal axis with a target camera focal length according to some embodiments.

FIG. 8 is a diagram illustrating an example of a first focal axis 104A with an original focal length and second focal axis 104B with a target camera focal length according to some embodiments. The target camera computation and image transformation can adjust the plane of focus, or move the center of focus without adjusting the direction or rotation of the focal axes 104A and 104B. Such a transformation permits the zooming effect or other customized focus-related visual effects without requiring physical adjustment of the camera 102 parameters.

Figure 9:
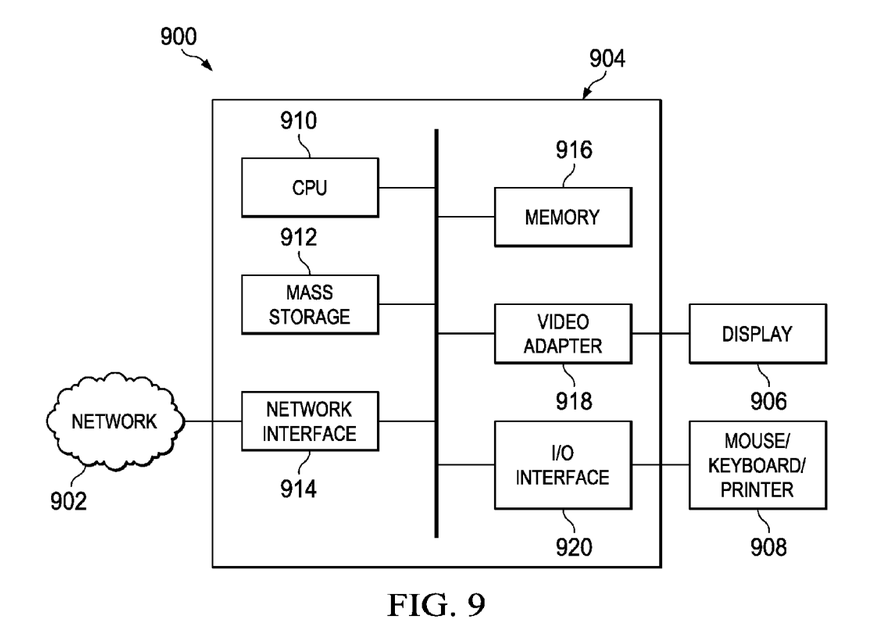
FIG. 9 is a block diagram of a processing system that may be used for implementing the system and methods disclosed herein.

FIG. 9 is a block diagram of a processing system 900 that may be used for implementing the system and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may be a node, camera or a controller such as a software systems controller and may comprise a processing unit 904 equipped with one or more input/output devices, such as a speaker, microphone, mouse 908, touchscreen, keypad, keyboard, printer, display 906, and the like. The processing unit may include a central processing unit (CPU) 910, memory 916, a mass storage device 912, a video adapter 918, and an I/O interface 920 connected to a bus.

The bus may be one or more of any type of several bus architectures including a memory bus or memory controller, a peripheral bus, video bus, or the like. The CPU 910 may comprise any type of electronic data processor. The memory 916 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 916 may include ROM for use at boot-up, and DRAM for program and data storage for use while executing programs.

The mass storage device 912 may comprise any type of non-transitory computer readable storage medium or device configured to store data, programs, and other information and to make the data, programs, and other information accessible via the bus. The mass storage device 912 may comprise, for example, one or more of a solid state drive, hard disk drive, a magnetic disk drive, an optical disk drive, a drive array, cloud storage, or the like. For example, the mass storage device may be connected to the CPU 910 disposed in a node or controller and may have instructions stored thereon for processing images, controlling cameras, gathering image sequences, storing image sequences before, after or during processing, or displaying processed image sequences, communicating with nodes and/or the controller, or executing the routing and power control optimization process.

The video adapter 918 and the I/O interface 920 provide interfaces to couple external input and output devices to the processing unit. As illustrated, examples of input and output devices include the display 906 coupled to the video adapter 918 and the mouse/keyboard/printer 908 coupled to the I/O interface 920. Other devices may be coupled to the processing unit 904, and additional or fewer interface cards may be utilized. For example, a serial interface such as Universal Serial Bus (USB) (not shown) may be used to provide an interface for a printer.

The processing unit 904 also includes one or more network interfaces 914, which may comprise wired links, such as an Ethernet cable or the like, and/or wireless links to access nodes, controllers, routers, or different networks 902. In some embodiments, the network interfaces permits the processing unit 904 to communicate with a camera array, or with a broadcasting system for gathering or transmitting and displaying image sequences. The network interface 914 allows the processing unit 904 to communicate with remote units via the networks 902. For example, the network interface 914 may provide wireless communication via one or more transmitters/transmit antennas and one or more receivers/receive antennas. In an embodiment, the processing unit 904 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method, comprising:
receiving calibrated image sequences, each of the calibrated image sequences corresponding to a camera in a camera array and having one or more image frames;

computing a target camera model for each of one or more first cameras in the camera array and according to target camera poses or target camera intrinsic matrices for the respective camera of the one or more first cameras, and wherein the computing generates a transformation matrix for each of the one or more first cameras; and applying the transformation matrix for each of the one or more first cameras to a calibrated image sequence corresponding to the respective camera;

wherein the applying the transformation matrix comprises warping each image frame of the calibrated image sequence; and wherein the applying the transformation matrix generates target image sequences.

2. The method of claim 1, further comprising at least one of determining target camera poses for the one or more first cameras and determining target camera intrinsic matrices related to the one or more first cameras;

wherein the target camera intrinsic matrices comprise coefficients for a target camera focal length along axes, and a skew coefficient between the axes.

3. The method of claim 2, wherein the transformation matrix is a general homography.

4. The method of claim 2, wherein the transformation matrix is a 3×3 matrix given by an equation:

$$P_i = K^*_i R^*_i R_i^{-1} K_i^{-1}$$

wherein $K^*_i$ is a target camera intrinsic matrix, $R^*_i$ is a target camera rotation matrix, $R_i^{-1}$ is an inverse rotation matrix of the camera corresponding to the transformation matrix, and $K_i^{-1}$ is an inverse intrinsic matrix of the camera corresponding to the transformation matrix.

5. The method of claim 2, further comprising:
acquiring image sequences from the camera array; and
generating the calibrated image sequences by calibrating the acquired image sequences.

6. The method of claim 5, wherein the calibrating the acquired image sequences comprises performing at least one of lens distortion correction or geometric correction on the acquired image sequences.

7. The method of claim 6, further comprising determining an intrinsic parameter and a extrinsic parameter for each of the cameras in the camera array;
wherein the lens distortion correction and geometric correction are performed according to the intrinsic parameter or the extrinsic parameter.

8. The method of claim 1, further comprising generating an output image sequence from one or more of the target image sequences; and
outputting the output image sequence by displaying or transmitting the output image sequences.

9. A system, comprising:
a processor; and
a non-transitory computer readable medium in communication with the processor and having stored thereon instructions for causing the processor to:
acquire a plurality of image sequences, each of the image sequences corresponding to a camera of a plurality of cameras in a camera array;
generate a plurality of calibrated image sequences from the plurality of acquired image sequences;
compute a plurality of target camera models, each of the plurality of target camera models corresponding to one of the plurality of cameras;
generate a plurality of transformation matrices for the plurality of cameras according to the target camera models; and generate a plurality of target image sequences from the plurality of calibrated image sequences and according to the plurality of transformation matrices.

10. The system of claim 9, wherein the instructions causing the processor to generate a plurality of target image sequences comprises instructions for warping image frames of each of the plurality of calibrated image sequences by applying one of the plurality of transformation matrices to a respective one of the plurality of calibrated image sequences.

11. The system of claim 9, wherein the non-transitory computer readable medium further has stored thereon instructions for causing the processor to:
determine target camera poses for the plurality of cameras; and
determine target camera intrinsic matrices for the plurality of cameras;
wherein the instructions causing the processor to generate a plurality of transformation matrices comprise instructions for generating the plurality of transformation matrices according to respective ones of the target camera poses and respective ones of the target intrinsic matrices.

12. The system of claim 11, wherein each of the plurality of transformation matrices is a general homography.

13. The system of claim 11, wherein each of the plurality of transformation matrices is a 3×3 transformation matrix associated with one of the plurality of cameras and is given by an equation:

$$P_i = K^*_i R^*_i R_i^{-1} K_i^{-1}$$

wherein $K^*_i$ is a target camera intrinsic matrix, $R^*_i$ is a target camera rotation matrix, $R_i^{-1}$ is an inverse rotation matrix of the camera corresponding to the transformation matrix, and $K_i^{-1}$ is an inverse intrinsic matrix of the camera corresponding to the transformation matrix.

14. The system of claim 9, wherein the instructions causing the processor to generate the plurality of calibrated image sequences comprise instructions for performing at least one of lens distortion correction, geometric correction or radiographic correction on the acquired image sequences.

15. The system of claim 9, wherein the non-transitory computer readable medium further has stored thereon instructions for causing the processor to:
determine a camera rotation matrix, a camera intrinsic matrix and a set of lens distortion coefficients for each of the plurality of cameras;
wherein the instructions causing the processor to generate the plurality of calibrated image sequences comprise instructions for generating the plurality of calibrated image sequences according to the camera rotation matrix, a camera intrinsic matrix and set of lens distortion coefficients.

16. The system of claim 9, wherein the non-transitory computer readable medium further has stored thereon instructions for causing the processor to:
generate an output image sequence from one or more of the target image sequences; and
output the output image sequence by displaying or transmitting the output image sequences.

17. A system, comprising:
a camera array having a plurality of cameras, each of the plurality of cameras having an overlapping field of view with another camera of the plurality of cameras; and
a processing system in signal communication with the camera array, the processing system having a first non-transitory computer readable medium having stored thereon instructions for causing processing system to:

cause the plurality of cameras to acquire a plurality of image sequences;
generate a plurality of calibrated image sequences from the plurality of acquired image sequences according to intrinsic and extrinsic parameters of the plurality of cameras;
save the plurality of calibrated image sequences to a second non-transitory computer readable medium;
generate a plurality of target image sequences from the plurality of calibrated image sequences, each of the plurality of target image sequences generated according to intrinsic parameters and extrinsic parameters of a model camera corresponding to a camera of the plurality of cameras; and
generate an output image sequence from one or more of the plurality of target image sequences.

18. The system of claim 17, wherein the non-transitory computer readable medium further has stored thereon instructions for causing the processing system to output the output image sequence by displaying or transmitting the output image sequences.

19. The system of claim 17, wherein the instructions causing the processing system to generate a plurality of target image sequences comprise instructions for causing the processing system to:

generate a plurality of transformation matrices for the plurality of cameras; and
warp image frames of each of the plurality of calibrated image sequences by applying one of the plurality of transformation matrices to a respective one of the plurality of calibrated image sequences;
wherein each transformation matrix of the plurality of transformation matrices is given by an equation:

$$P_i = K^*_i R^*_i R_i^{-1} K_i^{-1}$$

wherein $K^*_i$ is a target camera intrinsic matrix, $R^*_i$ is a target camera rotation matrix, $R_i^{-1}$ is an inverse rotation matrix of the camera corresponding to the transformation matrix, and $K_i^{-1}$ is an inverse intrinsic matrix of the camera corresponding to the transformation matrix.

20. The system of claim 17, wherein the instructions causing the processing system to generate a plurality of calibrated image sequences comprise instructions for causing the processing system to:
adjust each of the plurality of acquired image sequences based on intrinsic parameters and extrinsic parameters of a respective camera of the plurality of cameras.

* * * * *